INVENTOR.
LESLIE R. WALSTROM
BY
Braddock + Burd
ATTORNEYS

Aug. 4, 1970 L. R. WALSTROM 3,522,417

INFORMATION READER

Filed March 24, 1966 4 Sheets-Sheet 2

INVENTOR.
LESLIE R. WALSTROM
BY
Braddock & Burd
ATTORNEYS

INVENTOR.
LESLIE R. WALSTROM
BY
Braddock + Burd
ATTORNEYS

INVENTOR.
LESLIE R. WALSTROM
BY
Braddock & Burd
ATTORNEYS

United States Patent Office 3,522,417
Patented Aug. 4, 1970

3,522,417

INFORMATION READER

Leslie R. Walstrom, Minnetonka, Minn., assignor to Fabri-Tek Incorporated, Edina, Minn., a corporation of Wisconsin Filed Mar. 24, 1966, Ser. No. 537,104
Int. Cl. G06k *7/04;* G11b *23/14;* B41j *5/36*
U.S. Cl. 235—61.11 8 Claims

ABSTRACT OF THE DISCLOSURE

A punched tape reader including a plurality of sensing pins for reading the punched holes in the tape, a tape advance mechanism, and apparatus for providing a cycle reference signal to the data processor with which the reader is adapted to be used, all of which are synchronized by a single rotatable cam member.

This invention relates to peripheral information handling apparatus used in conjunction with a data processor for reading out information recorded on information storing medium in the form of electrical signals. More particularly, the invention is directed to a tape reader for reading information on 8-level punched paper tape in the form of electrical signals which an electronic computer can accept and use.

The reader of this invention is a low-cost, compact, portable and lightweight apparatus for reading information on punched tape. The reader has an information sensing unit having a plurality of pins which are movable toward and away from the punched tape to sense the information holes in the tape. The sensing unit operates in conjunction with a switch assembly having a plurality of switches which correspond in number and location to the information holes in the tape and operates to convert information in the form of holes to information as a function of electrical signals which are transmitted to a data processor.

The punch tape is intermittently advanced through the sensing unit with a tape advancing mechanism having a rotatable sprocket wheel coupled to a releasable drive including a ratchet wheel turned with a pivoted pawl. A sprocket wheel is located in driving engagement with the portion of the tape having a separate series of drive holes. A synchronized control means having a single rotatable cam is used to operate the sensing unit as well as the ratchet wheel used to rotate the sprocket wheel to advance the tape. In addition to the cam the synchronized control means has a switch actuator in the form of a magnet which triggers a switch to furnish an electrical reference signal for the data processor which tells the data processor when the sensing unit has risen to the read position and the switch assembly is ready to deliver a read-out signal to the data processor. A signal from the data processor is used to activate the control for the pawl whereby the cam is drivably connected to the mechanism used to advance or move the tape to the next information station or position. After the tape is advanced the cam activates the information sensing unit to begin another reading cycle.

Figures 1, 3:
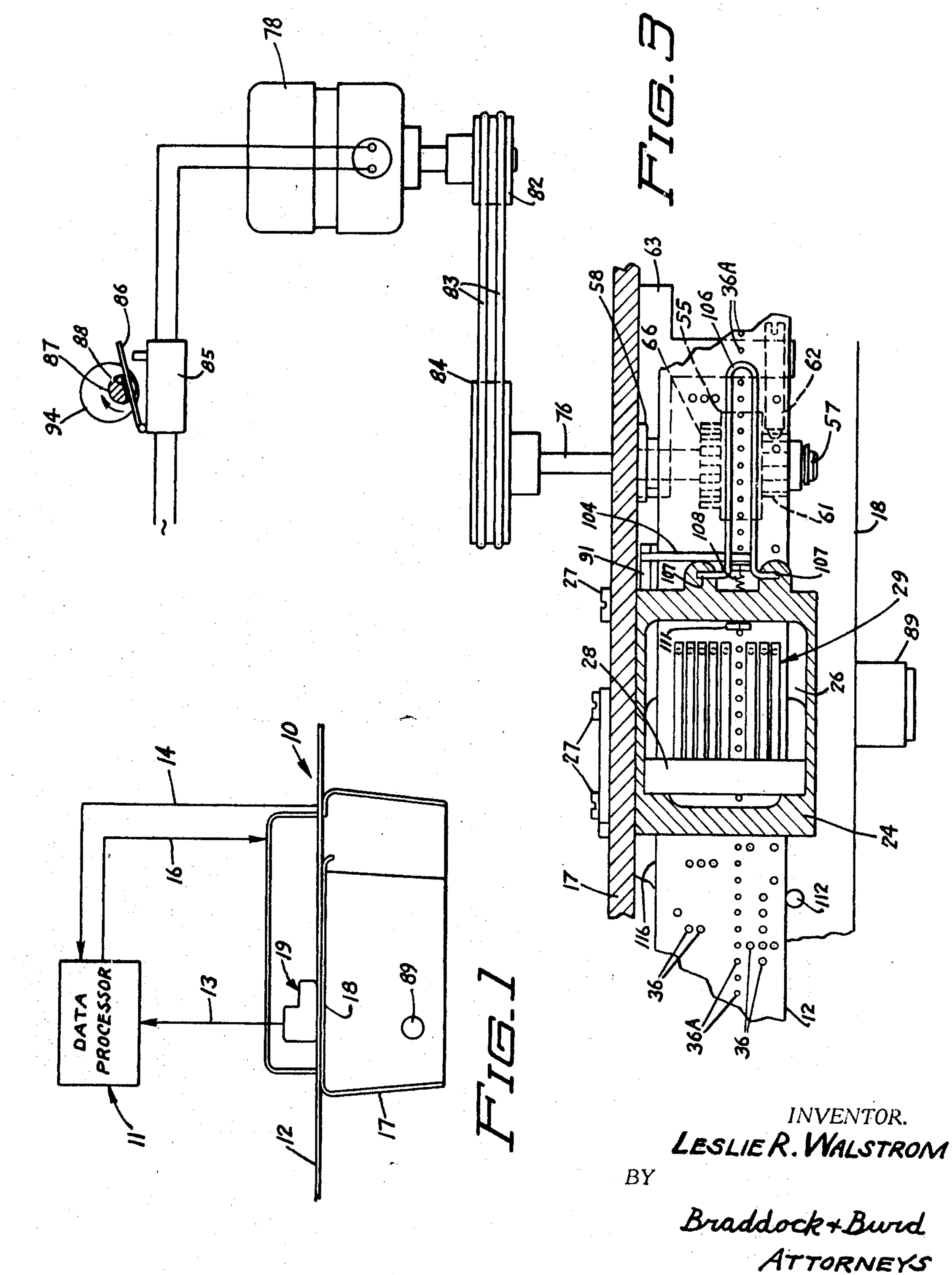
FIG. 1 is a diagrammatic view of the information reader of this invention coupled to a data processor.
FIG. 3 is an enlarged sectional view taken along the line 3—3 of FIG. 2.

Referring to the drawing there is shown in FIG. 1 an information handling system including the information reader of this invention indicated generally at 10 coupled to a data processor 11 such as an electronic computer. Reader 10 is used to sense information located on a storage medium 12 as punch tape, cards and 8-level paper tape, and sheet-like members and transmit this information to the data processor. In the following description the information storage medium 12 is an 8-level punched tape as shown in FIG. 3. Read-out signals established by reader 10 are transmitted through line 13 to the data processor 11. The data processor is triggered by a timing or reference signal developed by the reader and transmitted to the data processor through line 14. Timing signal informs the data processor that the punched tape has been advanced to a new information station and that the data recorded on the tape at this station are ready to be accepted by the data processor. After the data processor has accepted the information, a signal from the data processor is transmitted through line 16 to reader 10 and is used to activate the mechanism for advancing the tape to the next information station.

Figure 2:
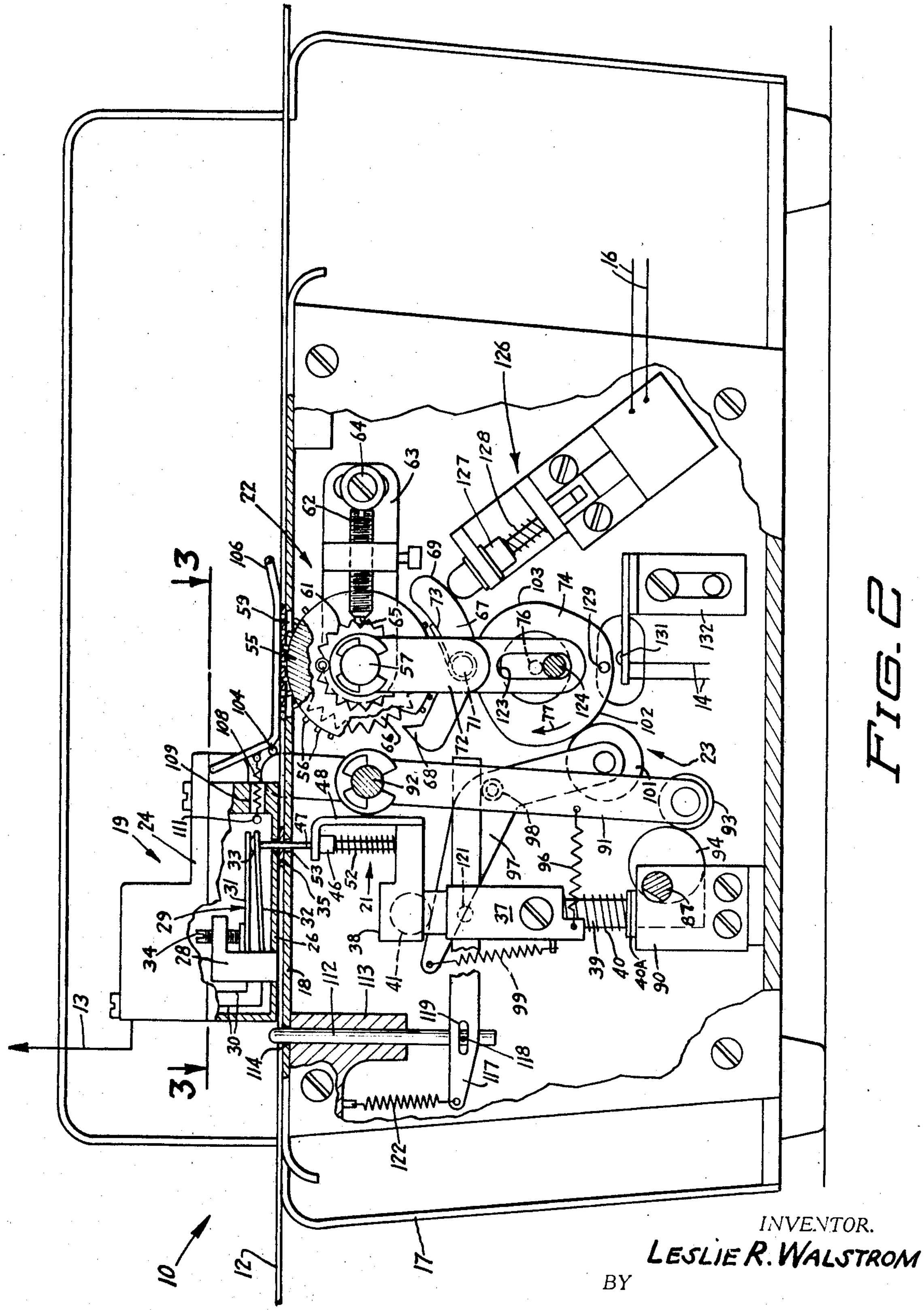
FIG. 2 is an enlarged front elevational view of the reader of FIG. 1 partly in section to show the assembled relationship of the information sensing unit, the mechanism for advancing the information storing medium from station to station, and the synchronized control means showing the information sensing unit in the read position.

As shown in FIG. 2, the functioning parts of the reader 10 are enclosed in a box-shaped cabinet or housing 17 having a horizontal table 18. A switch assembly 19 located above table 18 is actuated by an information sensing unit 21 to establish electrical read-out signals. Tape 12 is provided with a series of information stations each station having one or more punched holes representative of designated information. The tape is advanced from station to station by a tape advancing mechanism 22. Information sensing unit 21 and the tape advancing mechanism 22 are connected to a synchronized control means indicated generally at 23. The control means 23 has a three-way synchronized action which activates information sensing unit 21 in a timed relation with the operation of tape advancing mechanism 22. Control means 23 also produces a sequential timing electrical signal which is transmitted to the data processor 10 through line 14. This timing signal is synchronized with the actuation of information sensing unit 21 and is used to trigger the data processor to accept the information in form of electrical signals established in the switch assembly 19.

Switch assembly 19 shown in FIGS. 2 and 3, comprises a box-shaped housing 24 having a flat bottom wall 26 extended over and spaced slightly above the top of table 18. Bolts 27 secure housing 24 to an upright wall of housing 17. A support or block 28 of electrically insulative material is located in housing 24 and carries an array of pairs of leaf springs indicated generally at 29. Each of the leaf springs are electrically coupled to read-out line 13 by separate lines 30. Each pair of leaf springs are identical in construction and are arranged in a side-by-side location in 5–3 spacing for reading 8-level punched paper tape 12. Each pair of leaf springs has a forwardly projected top spring 31 positioned over a bottom spring 32. A contact 33 secured to the upper side of the outer end of bottom spring 32 faces the outer end of spring 31. Top spring 31 is a parallel pair of wires protruding from block 28 and biased downwardly by set screw 34. As shown in FIG. 2, bottom wall 26 has holes 35 aligned with the ends of each set of springs 31 and 32. Holes 35 are also aligned with information holes 36 in the tape 12 which also has a continuous longitudinal row of drive holes 36A as shown in FIG. 3.

Contact 33 is moved between opened and closed positions in response to actuation of the information sensing unit 21. The sensing unit 21 will close a contact when an information hole is aligned with a hole 35 and thereby establish a read-out signal for the data processor 11. The information sensing unit 21 movably mounted on a support 37 secured to a cabinet 17 is selectively moved up to a read position and biased down to a tape-advance position by the synchronized control means 23 and springs 40 respectively. Sensing unit 21 comprises a base 38 carrying a pair of downwardly projected legs 39 which slide in upright bores in support 37. Springs 40 surround the lower ends of legs 39 and are retained thereon by washers 40A and function to bias the sensing unit 21 in a downward direction to a non-read position.

Figure 4:
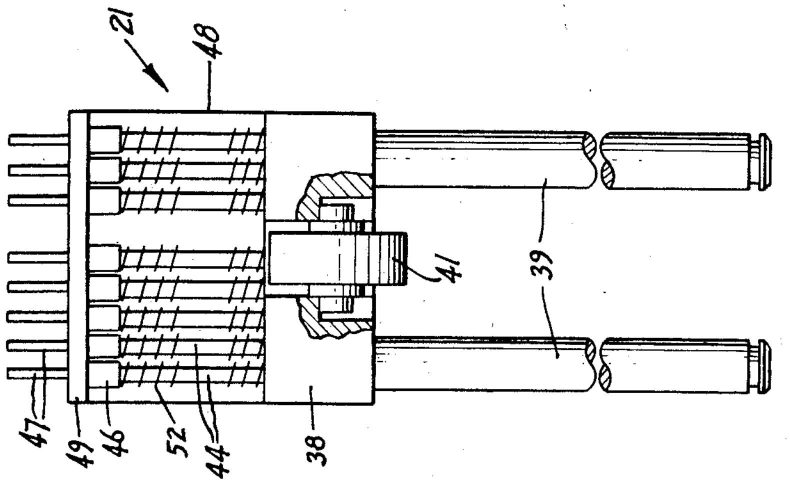
FIG. 4 is an elevational view partly sectioned of the finger sensing assembly.
Figures 5, 7:
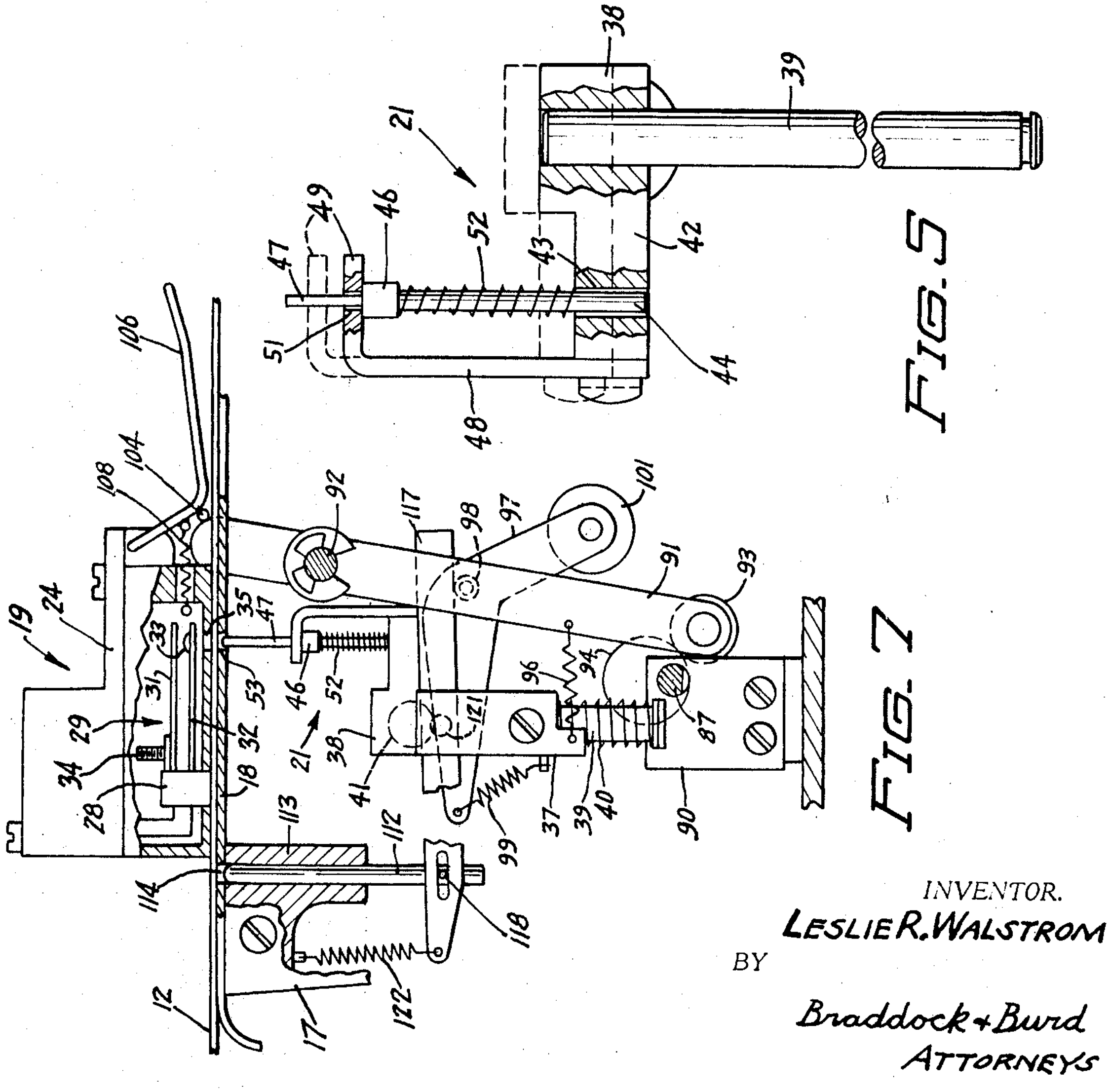
FIG. 5 is a side view of the sensing assembly of FIG. 4.
FIG. 7 is a diagrammatic view showing the tape guide and tape holding structure.

As shown in FIGS. 4 and 5, a roller 41 is rotatably mounted on base 38 between the legs 39. Roller 41 is located in an upwardly extended recess in the bottom of the base. Base 38 has a flat forward section 42 having a row of holes 43 accommodating the lower ends of pins 44 which are spaced in a 5–3 relationship identical to the array of pairs of leaf springs 29. Each pin has a top collar 46 carrying an upwardly projected head 47. Pins 44 are vertically aligned with an inverted L-shaped arm 48 secured to the forward end of flat section 42. Arm 48 has a rearwardly projected flange 49 having holes 51 for the heads 47. Collars 46 are biased into engagement with the lower side of flange 49 by separate coil springs 52 concentrically disposed about pins 44 and engageable with the top of flat section 42 and the lower side of collars 46. As shown in broken lines in FIG. 5, when the end of head 47 is prevented from moving upward, as is the situation when the tape does not have an information hole, base 38 and flange 49 move relative to pin 44 compressing spring 52.

As shown in FIG. 2, the information sensing unit 21 is located below table 18 with heads 47 aligned with holes 53 in the table 18. The control means 23 operates to raise the base 38 as indicated by arrow 54 against the biasing force of springs 40 thereby moving heads 47 up through holes 53 in table 18, through aligned information holes 36 in tape 12 and into engagement with the bottom spring 32, closing contact 33 with upper spring 31. This closes an electrical circuit establishing one or more read-out signals for data processor 11.

After the read-out signals have been received by the data processor, tape 12 is advanced to the next information station. This is achieved by the operation of tape advancing mechanism 22 which comprises a sprocket wheel 55 having radially outwardly projected teeth 56 evenly spaced around the circumference of the wheel. Wheel 55 located below table 18 is mounted on a transverse axle 57 carried by a support 58 secured to upright side wall of cabinet 17. Above wheel 55 table 18 has a rectangular opening 59 for accommodating the top segment of sprocket wheel 55 permitting the teeth 56 to project through drive holes 36A in tape 12.

An index gear 61 is secured to the outside of sprocket wheel 55. This movement is intermittent and equal to termine the step by step movement of the sprocket wheel 55. This movement is intermitent and equal to distance between information stations on tape 12. Screw 62 is mounted on a bracket 63 attached to the cabinet side wall by a screw 64. A spring biased ball or head 65 projects forwardly from screw 62 and engages the teeth of index gear 61 permitting gear 61 to rotate when an external force is applied and holding the gear in a locked position when external force is released thereby holding the tape 12 in a read position at an information station.

Sprocket wheel 55 is intermittently advanced through the use of a releasable drive comprising a ratchet wheel 66 secured to the inside of wheel 55 and a pawl 67 for driving the wheel 66. Pawl 67 has an arcuate shape and is located radially of the ratchet wheel. One end of pawl 67 has a V-shaped head 68 and the other end a tail 69. The mid-portion of pawl 67 pivots on a pivot pin 71 secured to a mid-portion of a crank arm 72. The upper end of arm 72 is pivotally mounted on axle 57. Pawl 67 is biased by spring 73 in a clockwise direction as shown in FIG. 2 so that head 68 moves into engagement with a tooth on the ratchet wheel 66 to affect a positive drive between the pawl and the ratchet wheel.

Information sensing unit 21 and tape advancing mechanism 22 are operated in synchronism with the control means 23 comprising a cam 74 mounted on a drive shaft 76 which is rotated in the direction of the arrow 77 by a motor 78 having a drive pulley 82 shown in FIG. 3. A pair of O-ring endless belts 83 are trained about pulley 82 and driven pulley 84 mounted on shaft 76 to transmit power from the motor 78 to cam 74. Motor 78 is connected to a source of electric power through a microswitch 85 having an actuator 86 engageable with a rotatable shaft 87 mounted on support 90. Shaft 87 has a flat side 88 engageable with actuator 86 so that on rotation of shaft 87 switch 85 will be turned on and off. A control knob 89 shown in FIGS. 1 and 3 secured to the outer end of shaft 87 projected from the cabinet 17 is used to rotate shaft 87.

Located between the information sensing unit 21 and the tape advancing mechanism 22 below table 18 is an upright yoke 91 pivoted on a transverse axle or pin 92 mounted on the cabinet 17. The lower end of yoke 91 carries a roller 93 which rides on a cam 94 secured to the inner end of shaft 87. A spring 96 coupled to the lower section of yoke 91 and fixed support 37 biases roller 93 into engagement with the periphery of cam 94. Cam 94 is rotated in opposite directions approximately 120° by turning knob 89 moving yoke 91 to an on position shown in FIGS. 2 and 6 and to an off position shown in FIG. 7. Support 90 has a horizontal wall 90A and a vertical wall 90B serving as stops for cam 94 to limit rotation of cam 94 between its on and off positions.

The mid-portion of yoke 91 carries an arcuate shaped sensing arm 97 pivotally connected to the yoke by a pivot pin 98. The upper end of arm 97 projects between legs 39 and rides on roller 41. A spring 99 connected to the upper end of arm 97 and support 37 biases the arm in a clockwise direction as shown in FIG. 2. The lower end of arm 97 rotatably carries a roller 101 which rides on the peripheral face of cam 74. Cam 74 has a non-circular shaped peripheral surface which is generally egg-shaped. The cam 74 is a generally elliptical shaped flat disc with a large end and a small end defined by a large cam face 102 and a small cam face 103. Large cam face 102 has a larger radius than small cam face 103 and has an arcuate extent of about 130°. On rotation of cam 74 sensing arm 97 will oscillate about pivot pin 98 moving the upper end of the arm in upward and downward directions. This reciprocates heads 47 of sensing pins 44 forcing the heads upward through the holes 53 and 35 in the table 18 and housing bottom wall 26, respectively.

The upper end of yoke 91 projects through a hole in table 18 and engages a transversely projected finger 104 secured to the lower side of a tape guide member 106. Guide member 106 is a generally U-shaped curved rod member having oppositely directed ears 107 projected in suitable holes in the forward side of the switch assembly housing 24. Guide member 106 projects forwardly from the housing and is adapted to engage the top of tape 12 forcing the teeth 56 of sprocket wheel 55 through drive holes 36A as shown in FIGS. 2 and 3. Spring 108 biases the guide member 106 toward table 18 and into engagement with finger 104 to hold the tape in operative engagement with sprocket wheel 55. As shown in FIGURE 2, spring 108 projects through a hole 109 in the forward wall of switch assembly housing 24 and is contacted to a small rod 111 providing an anchor for spring 108.

The tape 12 is aligned with the switch assembly 19 by an upright tape positioning and guide pin 112 slidably positioned in a suitable bore in a support 113 positioned below table 18 and secured to the cabinet 17. Table 18 has a hole 114 permitting pin 112 to project upwardly from the table. The top end of pin 112 holds the tape 12 in engagement with a linear edge 116 whereby the tape is laterally positioned under the switch assembly 19 so as to longitudinally align the information holes 36 with the sensing heads 47. The lower end of pin 112 is connected to a horizontal lever 117 by a pin 118 projected through a horizontal slot 119. The mid-portion of lever 117 is pivotally mounted by pin 121 to support 37. Spring 122 secured to the rear end of lever 117 and the support 113 biases the forward end of lever 117 into engagement with pivot pin 98 on the yoke 91. As the yoke 91 moves from the on position to the off position shown in FIG. 7, lever 117 is pivoted about pin 121 to move guide pin 112 in a downward direction so that the upper end of the pin is below the top of table 18. At the same time finger 104 moves forwardly pivoting guide member 106 upwardly away from table 18. This permits the tape to be moved under switch assembly housing 24 and guide member 106. When cam 94 is rotated to the on position, spring 122 pivots lever 117, moving pin 112 upwardly through hole 114 in table 18, and spring 108 pivots guide member 106 downwardly onto the tape.

Figure 6:
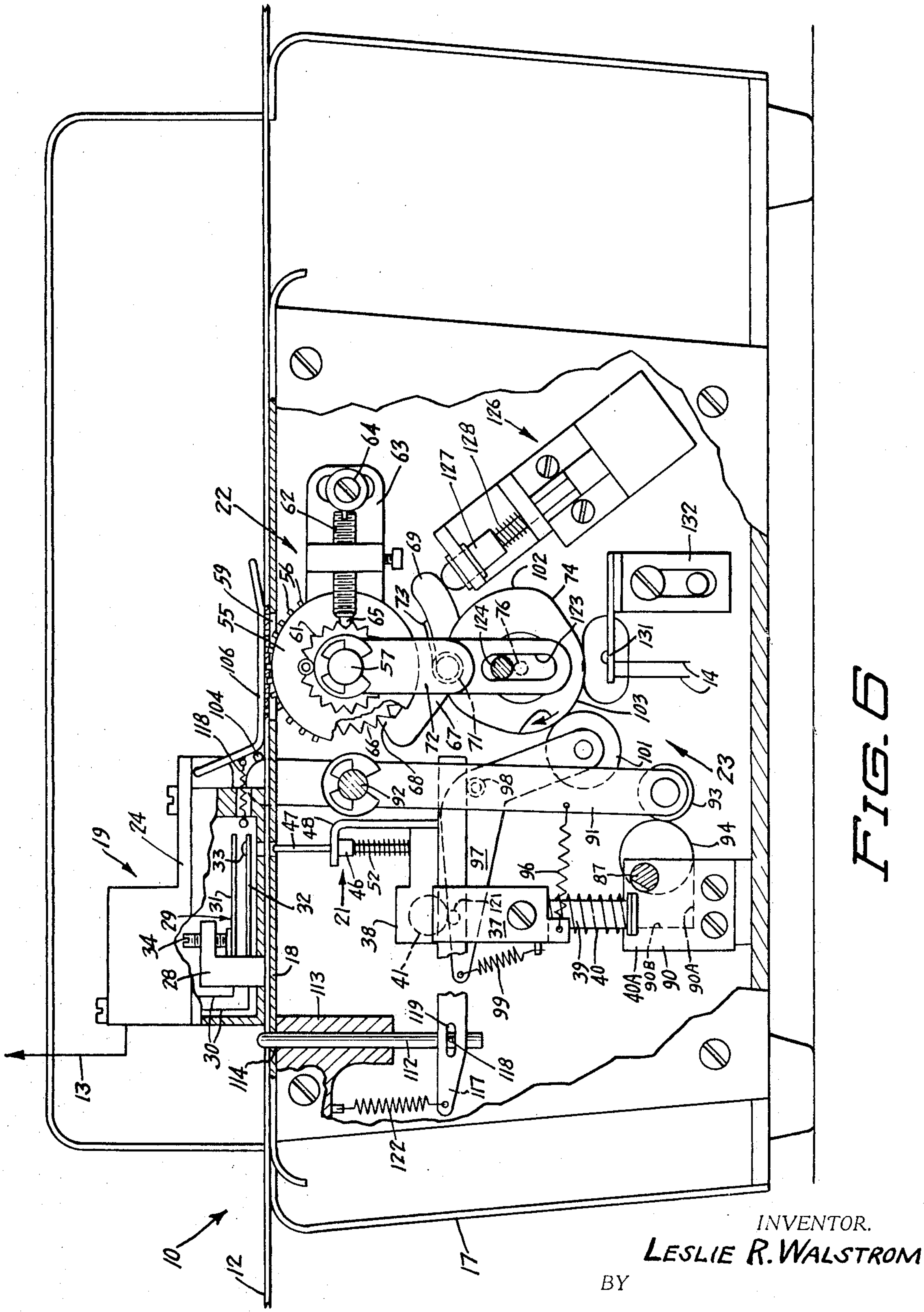
FIG. 6 is a view similar to FIG. 2 showing the information sensing unit in the non-read position and the tape drive in tape advancing position.

The tape advancing mechanism 22 is connected to the cam 74 by the crank arm 72. The lower end of arm 72 has an elongated slot 123 receiving a pin 124 secured to the side of cam 74 radially from the axis of rotation of the cam. This makes pin 124 an eccentric drive which oscillates crank arm 72 about axle 57. Since pawl 67 is pivotally attached to the mid-section of arm 72 it moves in an arcuate path along with the movement of arm 72. A control solenoid 126 is operatively associated with pawl 67 to hold the pawl head 68 out of operative engagement with ratchet wheel 66. Control solenoid 126 comprises a plunger 127 which is biased by a spring 128 into engagement with the tail 69 of the pawl to hold the pawl head 68 away from ratchet 66 as shown in FIG. 2. Solenoid 126 is energized in response to an electrical signal from the data processor and moves plunger 127 downwardly, allowing spring 73 to move pawl head 68 into engagement with a tooth on ratchet wheel 66 as shown in FIGURE 6. With pin 124 providing a positive drive connection between the rotating cam 74 and crank arm 72, the pawl 67 will rotate ratchet wheel 66 against the holding force of the spring biased ball 65 of detent 62. This rotates sprocket wheel 55 sufficiently to advance the tape 12 to the next information station. As soon as this is done solenoid 126 is deenergized whereby spring 128 moves plunger 127 in an upward direction pivoting the pawl 67 to a release position shown in FIG. 2 wherein head 68 is out of engagement with the teeth of ratchet wheel 66.

The data processor must know when the switch assembly 19 is in a position to read-out information, that is, when the pin heads 47 have actuated the array of pairs of leaf springs 29 as permitted by the information holes on tape 12. This information is synchronized with the position of sensing pin heads 47 by embedding a permanent magnet 129, such as an Alnico bar magnet, in the outer sector of a portion of the cam 74 adjacent the trailing part of large face 102. As shown in FIGURE 2, a magnetically actuated switch 131 mounted on a bracket 132 adjustably secured to the cabinet 17 is located immediately below the cam 74 and is actuated each time magnet 129 passes the switch. Switch 131 has a pair of overlapped reeds which are sensitive to a slight magnetic field surrounding magnet 129. Each time the cam 74 makes a revolution, magnet 129 passes the sensitive reeds, flexing the reeds sufficiently to make contact and thereby developing an electrical signal which tells the data processor that the tape 12 has been advanced, the sensing pin heads 47 have risen into the read-out position, and that the information recorded on the tape is ready to be accepted by the data processor.

In use, with tape 12 located under the switch assembly 19 on table 18, control knob 89 is turned to the read or on position. In this position shaft 87 holds switch actuator 86 in the on position thereby connecting the motor 78 with a source of electric power. Motor 78 through belts 73 drives shaft 76 which in turn rotates cam 74. When knob 89 is in the on position cam 94 holds the yoke 91 in a generally upright position moving the roller 101 on the end of sensing arm 97 into engagement with the outer periphery of cam 74. Thus, as cam 74 rotates arm 97 pivots about pin 98 moving the information sensing unit 21 in an upward direction against the force of springs 40 shown by arrow 54 in FIG. 2. As the sensing unit 21 moves upwardly, heads 47 of pins 44 move through holes 53 in the table 18 and either pass through the hole in the tape or engage the tape. The heads which pass through holes in the tape engage the lower finger 32 of the leaf springs closing the contact 33. The sensing unit will remain in this position as long as roller 101 engages the large cam face 102.

As cam 74 rotates, magnet 129 passes switch 131 which is actuated by the magnetic field of the magnet to send an electrical signal to the data processor which tells the data processor that the sensing pins 44 have risen into the read position and that the data recorded in the switch assembly are in condition to be accepted by the data processor. As soon as the data processor has accepted the read-out signal it sends a signal back to the reader 10 to energize the solenoid 126 for the purpose of advancing tape 12 to the next information station. When solenoid 126 is energized, plunger 127 is moved downwardly allowing spring 73 to pivot pawl 67 into engagement with the ratchet wheel 66. The pawl 67 being connected to crank arm 72 moves in an arcuate path established by the off-center crank pin 124 driving the arm 72.

This moves the tape to the next information station as determined by the transverse row of information holes 36 as well as the corresponding drive hole 36A. Detent 62 is used to hold the ratchet wheel 55 in a fixed position.

The control means 23 synchronizes the action of the sensing unit 21 with the tape advancing mechanism 22 and the reference signal for the data processor. This is accomplished by a single cam 74 having an elliptical shape which drives the information sensing unit to a read-out position. A crank pin secured eccentrically to the side of cam 74 imparts an oscillatory motion to the pawl and ratchet 66 and 67 used to advance the tape, and the embedded magnet 129 triggers the switch 131 to yield a reference signal on each revolution of cam 74. Thus, the cam 74 rigidly and automatically synchronizes the operation of the reader.

The foregoing disclosure relates only to a preferred embodiment of the invention and is intended to cover all changes and modifications which do not depart from the spirit and scope of the invention.

I claim:

1. An apparatus for handling information stored in positions on a sheet member comprising: first means for sensing the information at a position on the sheet member, second means for moving the sheet member intermittently relative to the first means to sequentially align the information at each position with the first means, control means including an arm engageable with the first means, releasable drive means coupled to the second means and a single movable member operable to actuate in sequence the arm to move the first means to sense the information at a position and the releasable drive means to move the second means to advance the sheet member to another information position, switch means mounted adjacent the movable member for establishing a reference signal, and actuator means mounted on the movable member sequentially engageable with the switch means on movement of the movable member to thereby establish sequential reference signals.

2. The apparatus of claim 1 further characterized by said second means including wheel means engageable with said sheet member for moving said sheet member on rotation of the wheel means, indexing means for holding the wheel means in positions wherein the information positions are sequentially aligned with the first means, said releasable drive means including a ratchet wheel secured to the wheel means, a crank arm pivotally mounted adjacent said ratchet wheel, pawl means pivotally mounted on the crank arm and adapted to engage the ratchet wheel to provide a drive between the crank arm and ratchet wheel, a pin mounted eccentrically on the cam and connected to the crank arm to oscillate the crank arm, and control means for holding the pawl means out of engagement with the ratchet wheel, said control means operable to allow the pawl to pivot into driving engagement with the ratchet wheel whereby the crank arm on rotation of the cam moves the wheel means to advance the sheet member to the next information position.

3. The apparatus of claim 1 in which the switch means is actuated in response to a magnetic field from magnet means secured to the single movable member so that on movement of the movable member the switch means will be actuated to establish a reference signal.

4. An apparatus for use with a data processor for reading-out information stored in positions on a sheet member comprising: a switch assembly having a plurality of switches electrically adapted to be coupled to the data processor, an information sensing unit having means for sensing information stored at a position on the sheet member and actuating said switches to convert sensed information to electrical signals, a mechanism for intermittently advancing the sheet member to sequentially align the information at each position with the means for sensing information and the switches, a cycle switch operable to establish a reference signal for the data processor which tells the data processor when the switch assembly is ready to deliver a read-out signal to the data processor, and a control means including a single movable member operable to actuate in sequence the means for sensing information and actuating the switches of the switch assembly, the cycle switch to establish a reference signal for the data processor and the mechanism for advancing the sheet member to the next information position.

5. The apparatus of claim 4 wherein said cycle switch has magnetically actuable contact members movable to establish an electrical contact, said single movable member having means to create a magnetic field sufficient to displace the movable contact members when located adjacent the contact members to thereby establish a reference signal for the data processor.

6. The apparatus of claim 4 wherein said single movable member is a rotatable cam, said mechanism includes wheel means engageable with said sheet member for moving the sheet member on rotation of the wheel means, a ratchet wheel connected to the wheel means, a crank arm pivotally mounted adjacent said ratchet wheel, pawl means pivotally mounted on the crank arm and movable to engage the ratchet wheel to provide a drive between the crank arm and the ratchet wheel, a pin mounted eccentrically on the cam and connected to the crank arm to oscillate the crank arm on rotation of the cam, and control means for holding the pawl means out of engagement with the ratchet wheel, said control means adapted to be responsive to a signal from the data processor to allow the pawl to pivot into driving engagement with the ratchet wheel whereby the crank arm on rotation of the cam moves the wheel means to advance the sheet member.

7. In an apparatus for handling information stored in positions on a sheet member: first means for sensing the information at a position on the sheet member, second means for intermittently advancing the sheet member to sequentially align the information at each position with said first means, said second means comprising wheel means engageable with said sheet member for moving the sheet member on rotation of the wheel means, a ratchet wheel connected to the wheel means, a crank arm pivotally mounted adjacent said ratchet wheel for movement about the axis of the ratchet wheel, pawl means pivotally mounted on the crank arm, said pawl means located radially of the ratchet wheel and movable to engage the ratchet wheel to provide a drive between the crank arm and the ratchet wheel, drive means for oscillating the crank arm and thereby angularly move the pawl means, and control means for holding the pawl means out of engagement with the ratchet wheel, said control means operable to allow the pawl to pivot into driving engagement with the ratchet wheel whereby the crank arm on operation of the drive means moves the wheel means to advance the sheet member to the next information position.

8. The apparatus of claim 7 including indexing means for holding the wheel means in places wherein the information positions are sequentially aligned with the first means for sensing information at a position on the sheet member.

References Cited

UNITED STATES PATENTS

| | | | |
|---|---|---|---|
| 2,765,038 | 10/1956 | Rhodes | 235—61.112 X |
| 2,833,475 | 5/1958 | Dedek. | |
| 2,905,298 | 9/1959 | Blodgett | 197—20 |
| 3,100,834 | 8/1963 | Demer. | |
| 3,196,256 | 7/1965 | Tripp | 235—61.112 |
| 3,205,323 | 9/1965 | Deshautreaux | 200—87 |
| 3,312,372 | 4/1967 | Cooper | 222—2 |
| 3,414,716 | 12/1968 | Jones | 235—61.11 |
| 2,555,734 | 6/1951 | Dodge | 197—20 |
| 3,448,249 | 6/1969 | Jones | 235—61.11 |

DARYL W. COOK, Primary Examiner

R. M. KILGORE, Assistant Examiner

U.S. Cl. X.R.

178—112; 197—20